(12) United States Patent
James

(10) Patent No.: US 7,936,920 B2
(45) Date of Patent: May 3, 2011

(54) METHOD AND APPARATUS FOR MULTIPLE DATA CHANNEL ANALYSIS USING RELATIVE STRENGTH HISTOGRAMS

(75) Inventor: Brian G. James, Vernon (CA)

(73) Assignee: Athentech Technologies Inc, Calgary (CA)

( * ) Notice: Subject to any disclaimer, the term of this patent is extended or adjusted under 35 U.S.C. 154(b) by 1012 days.

(21) Appl. No.: 11/577,497

(22) PCT Filed: Oct. 25, 2005

(86) PCT No.: PCT/CA2005/001639
§ 371 (c)(1),
(2), (4) Date: Apr. 18, 2007

(87) PCT Pub. No.: WO2006/045189
PCT Pub. Date: May 4, 2006

(65) Prior Publication Data
US 2009/0190828 A1    Jul. 30, 2009

(30) Foreign Application Priority Data

Oct. 25, 2004  (CA) .................................. 2485887

(51) Int. Cl.
*G06K 9/00* (2006.01)
*G06K 9/38* (2006.01)

(52) U.S. Cl. ......... 382/167; 382/162; 382/168; 382/172

(58) Field of Classification Search ........................ None
See application file for complete search history.

(56) References Cited

U.S. PATENT DOCUMENTS

| | | | |
|---|---|---|---|
| 5,544,258 A | | 8/1996 | Levien |
| 5,809,165 A * | | 9/1998 | Massen .................... 382/168 |
| 6,049,626 A * | | 4/2000 | Kim .......................... 382/167 |
| 6,535,245 B1 * | | 3/2003 | Yamamoto ................. 348/223.1 |
| 6,628,830 B1 * | | 9/2003 | Yamazoe et al. ............. 382/168 |
| 6,947,078 B1 * | | 9/2005 | Kuwata et al. ............. 348/223.1 |
| 7,158,174 B2 * | | 1/2007 | Gindele et al. ............. 348/224.1 |
| 7,613,339 B2 * | | 11/2009 | Toshihiro et al. ............. 382/162 |
| 2003/0007689 A1 | | 1/2003 | Huniu |

(Continued)

FOREIGN PATENT DOCUMENTS

EP    0298978 B1    2/1992

(Continued)

OTHER PUBLICATIONS

Finlayson et al., "Illuminant estimation for object recognition", COLOR Research and Application, 2002, Wiley Periodicals Inc.

(Continued)

*Primary Examiner* — Samir A Ahmed
*Assistant Examiner* — Li Liu
(74) *Attorney, Agent, or Firm* — Sean W Goodwin

(57) ABSTRACT

Relative histograms compare occurrences in event channels for a multi-channel data set for determining comparisons therebetween. One or more relative histograms are formed using relating functions applied to channels, preferably including a quotient between a first reference channel and a second channel and between the reference channel and at least a third channel. Preferably the relating functions generate values where a ratio and its reciprocal are symmetrical about an identity value. More preferably a data set is presented in a two-dimensional histogram for establishing the deviation of significant counts from an adjustment point which is preferably at the identity value. In practice, the relative histograms can be applied to correct tint in the red, green and blue channels of color images.

29 Claims, 17 Drawing Sheets

Quadrants of 2-D relative histogram

U.S. PATENT DOCUMENTS

2004/0073544 A1    4/2004    Kim et al.
2004/0197022 A1*  10/2004  Gonsalves ................... 382/167
2005/0063582 A1*  3/2005  Park et al. ................... 382/154

FOREIGN PATENT DOCUMENTS

| EP | 0822416 A2 | 4/1998 |
|----|------------|--------|
| EP | 0822416 A3 | 5/2000 |
| EP | 1336852 A2 | 8/2003 |
| EP | 1482447 A1 | 1/2004 |
| EP | 1336852 A3 | 5/2004 |
| EP | 1418543 A2 | 12/2004 |
| JP | 2003289452 A | 10/2003 |
| WO | 02093463 A1 | 11/2002 |

OTHER PUBLICATIONS

Rizzi et al., "A new agorithm for unsupervised global and local color correction" Pattern Recognition Letters, 2002, Elsevier Science.

Goldstein, Michael; "Systematic Color Correction in Adobe Photoshop", Apogee Photo Magazine; www.apogeephoto.com/june2000/color_correction.shtml, 2000.

Photo Color Correction, Adobe Photoshop Tutorial; www.photocolorcorrection.com/histogram.html; accessed Oct. 18, 2005.

Histogram Dialog; //docs.gimp.org/en/ch08s06.html; accessed Oct. 18, 2005.

Ido Omer and Michael Werman; Color Lines: Image Specific Color Representation; printed Oct. 18, 2005, 2004.

Ido Omer and Michael Werman; Image Specific Color Representation; printed Oct. 18, 2005, 2004.

F. Gasparini and R. Schettini; Unsupervised Color Correction for Digital Photographs; //old.disco.unimib.it/ivl/papers2003/cast-iciap.pdf; printed Oct. 18, 2005, 2003.

Cheevasuit et al.; Cloud cover and could shadow removing based on 2-dimensional histogram; www.gisdevelopment.net/aars/acrs/1992/diph/diph004pf.htm, 1992.

Bin by bin histogram comparisons; wwwasdoc.web.cern.ch/wwwasdoc/hbook_html3/node97.html, 1995.

Srikathyayani Srikanteswara; Feature Identification in Wooden Boards Using Color Ima Segmentation; http//scholar.lib.vt.edu/theses/available/etd-110498-155647/unrestricted/chap2and2.pdf;

Chapter 3. Methods—http//scholar.lib.vt.edu/theses/available/etd-110498-155647/unrestricted/chap3.pdf, 1997.

* cited by examiner

Original which may require tint correction red green blue

Histogram of red

Histogram of green

Histogram of blue

*Stretched Histogram of red*

*Stretched Histogram of green*

*Stretched Histogram of blue*

*Adjustment using stretched histograms as applied to Fig. 1 (tint becomes too blue)*

Primary Color Value (0 - 255)

*Amplified histogram of blue of Fig. 1 (Fig. 4)*

*Relative histogram of green/red of Fig. 1*

*Relative histogram of blue/red of Fig. 1*

FIG. 15

*(to calc one occurrence as will be counted into the relative histograms)*

Public Function f_hist_valu_i(base_i As Integer, valu_i As Integer) As Integer

```
Dim base_1 As Single
Dim valu_1 As Single
base_1 = CSng(base_i)
valu_1 = CSng(valu_i)

Dim hist_valu_1 As Single
Dim hist_valu_i As Integer
If valu_1 <= base_1 Then
    hist_valu_1 = valu_1 / base_1
Else
    hist_valu_1 = 2# - base_1 / valu_1
End If
hist_valu_i = CInt(100# * hist_valu_1)

f_hist_valu_i = hist_valu_i

End Function
```

Fig. 16
*(for counting relative histogram occurrences)*

```
For indx = 0 To imag_wdth - 1
 For indy = 0 To imag_hght - 1
  If red(indx, indy) > 0 Then
   If gren(indx, indy) > 0 Then
    If blue(indx, indy) > 0 Then
     gren = f_hist_valu(red(indx, indy), gren(indx, indy))
     rela_gren(gren) = rela_gren(gren) + 1
     blue = f_hist_valu(red(indx, indy), blue(indx, indy))
     rela_blue(blue) = rela_blue(blue) + 1
    End If
   End If
  End If
 Next indy
Next indx
```

*2-D relative histogram of Fig. 1*

Fig. 18
*(for counting 2-D relative histogram occurrences)*

```
For indx = 0 To imag_wdth
 For indy = 0 To imag_hght
  If red(indx, indy) > 0 Then
   If gren(indx, indy) > 0 Then
    If blue(indx, indy) > 0 Then
     gren = f_hist_valu(red(indx, indy), gren(indx, indy))
     blue = f_hist_valu(red(indx, indy), blue(indx, indy))
     re2d(gren, blue) = re2d(gren, blue) + 1
    End If
   End If
  End If
 Next indy
Next indx
```

*2-D relative histogram of Fig. 1(Logarithm)*

*Quadrants of 2-D relative histogram*

Fig. 21
(for determining significant counts)

```
' sort into decending order
 call s_sort_re2d(re2d(), sort_re2d(), sort_indx(),
sort_indy());
 fTotal = 0.0
 fSum = 0.0
' find total count
 For indx = 0 to 10200
    fTotal = fTotal + sort_re2d(indx)
 Next indx
' find sum of strongest 1% of count
 For indx = 0 to 102
    fSum = fSum + sort_re2d(indx)
 Next indx
' find the ratio of the strongest 1% of count to total count
 fRatio = fSum / fTotal
' use a linear map to find the % of signficant data
 corr_pcnt = 2.0 - (fRatio - 0.3) * 1.5 / 0.4;
```

Fig. 22b
(for determining correction multipliers)

```
gren_corr = CSng(sort_indx(clos)) / 50.0
blue_corr = CSng(sort_indy(clos)) / 50.0

' convert "corrections" to channel multipliers
if gren_corr < 1.0 then
  gren_mult = 1.0 / gren_corr
else
  if gren_corr > 1.0
    gren_mult = 2.0 - gren_corr
  else
    gren_mult = gren_corr
  end if
end if
if blue_corr < 1.0 then
  blue_mult = 1.0 / blue_corr
else
  if blue_corr > 1.0 then
    blue_mult = 2.0 - blue_corr
  else
    blue_mult = blue_corr
  end if
end if
```

Original at left has a red tint which is
corrected at right using an embodiment of
the present invention Original at left has a blue tint which is
corrected at right using an embodiment of
the present invention

*Original (from Fig. 1) is unchanged and thus no tint correction was required.*

Primary Color Value (0 - 255)

*Correction discouraged for cases as above for very weak channels.*

METHOD AND APPARATUS FOR MULTIPLE DATA CHANNEL ANALYSIS USING RELATIVE STRENGTH HISTOGRAMS

FIELD OF THE INVENTION

This invention relates to methodologies and apparatus for the comparison and adjustment of digital data having multiple data events or channels through summarizing and comparing the occurrences within one event channel as compared to another event channel. More particularly, color triplets of strength data of R, G and B event channels for a digital image data are compared using two-dimensional relative histograms for enabling color correction of the image.

BACKGROUND OF THE INVENTION

Digital data is often obtained with a plurality of event channels including audio tracks and photography. In the context of photography, which is not intended to be limiting, the event channels are the primary colors of red, green, and blue (R, G and B) present for each dot of a population of data or dots in the image. Due to a variety of real-world characteristics, an image may not necessarily duplicate that which was seen by the eye, or one may wish to otherwise alter the image which was captured. An image may be scanned from film photography or be captured digitally form the outset.

In the case of conventional film photography, a photograph image taken with standard daylight film in daylight will typically result in a pleasing picture as daylight spectrum is skewed to the blue end of the visible light spectrum. However, use of daylight film in a room illuminated by a standard tungsten filament incandescent light source will characteristically result in a yellowish tint because a tungsten filament has a spectrum skewed to the yellow portion of the visible light spectrum. Some prior art techniques in film photography is to use a particular film which attempts to correct for such lighting conditions. In the case of direct digital photography, the correction must be applied using a filter (which will affect the entire of the image) or based on image correction techniques.

There are current technologies that use histograms as an approach to tint correction. Many standard image enhancement computer programs offer this approach as an option.

A color photograph is best thought of as a composite of three "primary color" images. These three primary color images are superimposed on each other to give the color photograph. The three primary colors are red, green and blue. FIG. 1 is a color photograph of a young lady reading on a couch. FIG. 2 is the red component of that photograph. FIGS. 3 and 4 are the green and blue components of FIG. 1, respectively.

A standard histogram analysis yields three normal histograms of FIG. 1. FIG. 5 is the histogram of the red component. FIGS. 6 and 7 are the histograms of the green and blue component, respectively.

The standard approach is to "stretch the histograms" in the following manner. A single "tolerable" rate for the clipping of all 3 channels (red, green, blue) is set. Often this is a number near 1%. A running total of the histogram is calculated starting from 0 on the x axis. The point at which the lower tolerance (–1%) occurs and the upper tolerance (–99%) occurs is taken to represent the "good data" and the histograms are stretched so that these points become the new 0 and 255 values.

The mathematical linear transformations:

$$red_{out} = slope_{red} * red_{in} + intercept_{red}$$

$$green_{out} = slope_{green} * green_{in} + intercept_{green}$$

$$blue_{out} = slope_{blue} * blue_{in} + intercept_{blue}$$

are calculated and the histograms are then "stretched" in this way. See FIGS. 8, 9 and 10 for histogram stretching for the red, green and blue channels, respectively.

Once the linear transforms are known, the image can also be stretched in the same way, that is to say, using the identical mathematical equations. See FIG. 11 for the modified photograph.

It is difficult to see from in a Black and White rendering of FIG. 11, however while the corrected photograph has a pleasing overall tone to it, the young woman's skin tone is now unacceptably blue. What went wrong?

The approach of adjusting the three channels independently and using a common "acceptable" rejection percentage at both the top and bottom edges of the histograms—assumes that there is a similarity with the basic statistical measures of the three histograms. This is undoubtedly often the case but it is not necessarily valid.

FIG. 12 is an amplified version of FIG. 4. It can be seen that there are a small, but non-zero, number of occurrences of large values for blue. These are important as ignoring them calculates too much blue amplification. Simply put there are times when these weak occurrence "tails" are important preserve and other times when they are important to disregard.

What is required is a technique which is sensitive to variations between the event channels of data populations.

SUMMARY OF THE INVENTION

The present invention applies relative histograms to compare occurrences in event channels for a multi-channel data set. Instead of summarizing occurrences of events, one summarizes the occurrences of one event channel in relation to another event channel. In the case of data for images such as color photographs, this would naturally take the form of one or more histograms including, for example, the ratios of primary colors R, G and B, or the red, green and blue channels. Without intending to be limiting, one might choose the red channel as a "reference" channel and create histograms of green/red and blue/red. A comparison of the relative histograms suggests deficiencies in the one channel compared to another. As opposed to conventional histograms which identify disparities in the range in a channel, relative histograms minimize the influence of channel-specific range or intensity and instead identify disparities in one channel compared to another.

In one embodiment, one-dimensional relative histograms can be compared for revealing the inter-relationship between two signal channels.

In another embodiment, two-dimensional relative histograms further aid in illustrating particular variations between event channels. For example, in the case of a color image, 2-D relative histograms demonstrate "whiteness" or intensity of the image. Relative histograms of green/red are set forth on a horizontal axis and blue/red values are set forth on the vertical axis. Preferably for aiding the illustration for review by the human eye, a logarithmic representation is applied to the relative histogram data as the eye is rather insensitive to intensities compared to the vertical displacements of 1-D histograms. Logarithms show weaker values better in an intensity display.

In one embodiment, when relative histograms are applied to tint correction of color photographs, and applying certain assumptions, 2-D relative histograms can be applied to first indicate if a color correction is required and, when required, to enable a correction to be made. One assumes that there should exist in the corrected image either a significant amount of gray/white values (1.0, 1.0) or a distribution of significant counts which span the (1.0, 1.0) value. Without a need to consider the intensity of any of the measured colors, there should be some distribution of colors (dark or bright) which either include white (gray) or encompass white (gray). Then, if a photograph has significant 2-D relative histogram counts in any 3 of the quadrants, this is taken to mean that it has colors that encompass white/gray and therefore does not need correction.

Instead, if there are only counts in a single quadrant or two adjacent quadrants then a correction is needed. The correction is based on the x and y (horizontal and vertical) position of the nearest significant count to the (1.0, 1.0) white/gray point. A correction is taken to be a simple common multiplication of all values in the green and blue channels. First, "correction" values are identified by simply dividing the values of both the x and y indexes by the x and y indexes, respectively, of white/gray, which in this case is (50, 50) without meaning to be limiting. These "correction values" are really just the histogram x and y coordinates in terms of the 0.0 to 2.0 range. The correction values are turned into "correction multipliers" by using adapting the function used in the creation of relative strength histograms in the first place. Finally, the correction is then applied by looping through the entire image to apply the corresponding correction multipliers to each dot and every dot and then to reconstruct the image.

In a broad aspect then, a method is provided for obtaining a distribution of the relationship between multiple channels of a signal data set comprising: selecting a first reference channel of the signal data set; obtaining a first relative function by relating a second channel of the signal data set to the first reference channel for establishing a plurality of first related values; obtaining a second relative function by relating at least a third channel of the signal data set to the first reference channel for establishing at least a plurality of second related values indexed to the first related values; and forming one or more relative histograms of the occurrences of the plurality of first related values and the plurality of second related values. Preferably, the one or more relative histograms are formed by a two-dimensional relative histogram of the occurrences indexed to both of the plurality of first related values further indexed to the plurality of second related values.

The method can be implemented as a computer program or implemented on apparatus including a multi-channel signal processor comprising: a signal memory for receiving and storing a plurality of data for a reference channel and each of two or more additional channels for a data set; a first relative array for storing a plurality of first related values determined by relating a second channel of the at least two or more additional channels to the first reference channel; a second relative array for storing a plurality of second related values determined by relating a third channel of the at least two or more additional channels to the first reference channel; and a channel comparator for forming one or more histograms, a preferably a two-dimensional relative histogram for determining the distribution of the first and second related values.

More preferably, an embodiment can be implemented in a photographic image wherein the apparatus for correcting color therein comprises: selecting means for selecting a first reference channel from red, green or blue channels containing signal data for the image; a first relative function for relating a second channel of the red, green or blue channels to the first reference channel for establishing a first array of first related values; a second relative function for relating a third channel of the red, green or blue channels to the first reference channel for establishing a second array of second related values indexed to the first relative value; histogram generator for forming one or more histograms for determining the distribution of the first and second related values; a comparator for identifying deficiencies in the reference, second and third channels; and a correction function for adjusting one or both of the second and third channels. Preferably, the histograms are in the form of a two-dimensional relative histogram and wherein the domain of the two-dimensional relative histogram is in quadrants and a correction function further comprises: an array of significant occurrences of the plurality of first related values indexed to the plurality of second related values; and where the significant occurrences lie in less than three quadrants, then adjusting the related channels to shift the significant occurrences lie at or in all four quadrants.

BRIEF DESCRIPTION OF THE DRAWINGS

FIG. 15 is a Microsoft™ visual basic code illustrating a form of calculation for determining a relative value representing one occurrence as it counted into the relative histograms;

FIG. 16 is a visual basic code for counting 1-D relative histogram occurrences;

FIG. 18 is a visual basic code for counting 2-D relative histogram occurrences;

FIG. 21 is a visual basic code for determining significant counts;

FIG. 22*b* is a visual basic code for determining correction multipliers;

DESCRIPTION OF THE PREFERRED EMBODIMENT

Figure 1:
FIG. 1 is a color photograph of a young woman the identity of which has been obscured.
Figure 2:
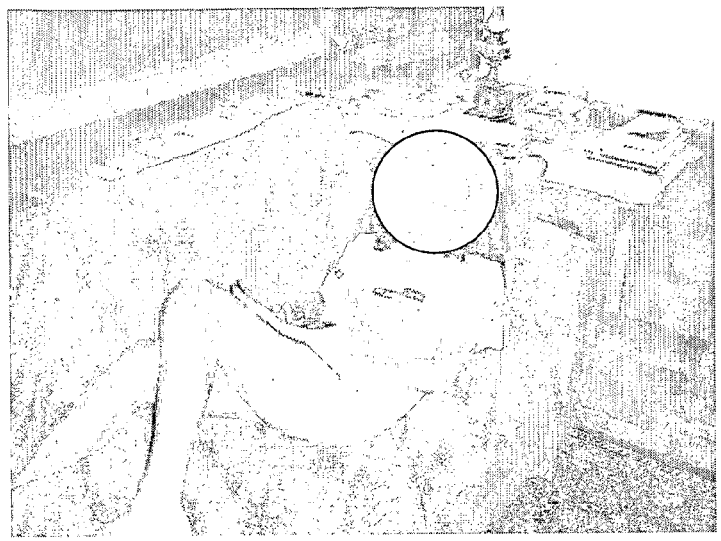
FIGS. 2, 3 and 4 are the red, green and blue components or channels of the original image of FIG. 1 respectively.
Figure 3:
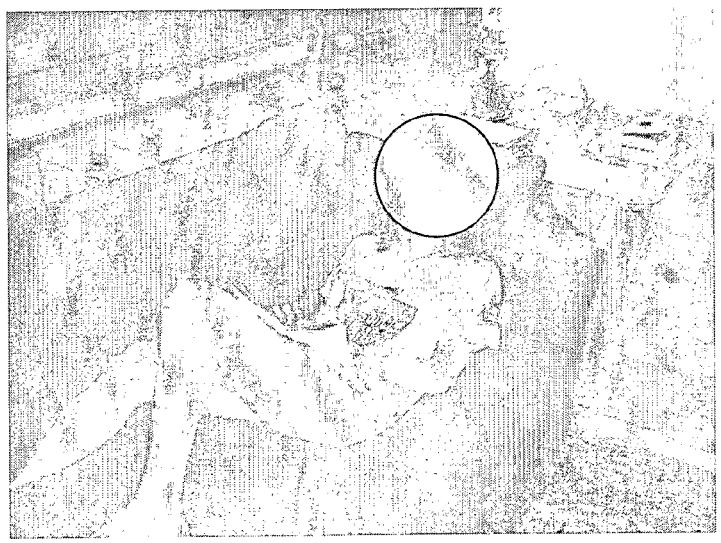
Figure 4:
Figure 5:
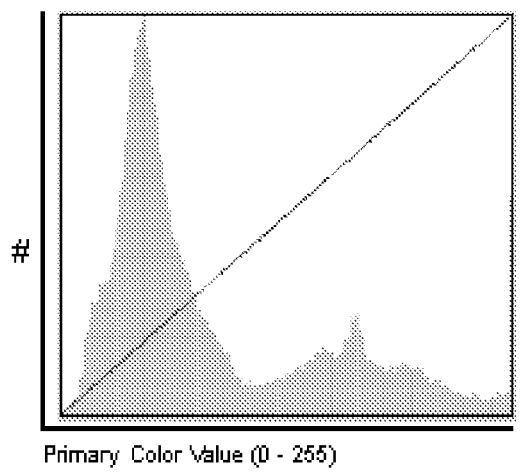
FIGS. 5, 6 and 7 are conventional histograms of the red, green and blue channels of the original image of FIG. 1 respectively.

The conventional treatment of multi-channel signal data, such as the color channels of a color photograph of FIG. 1 is illustrated in FIGS. 5-12. Embodiments of the present invention are set forth FIGS. 13-26.

1-D Relative Histogram

In a first embodiment a 1-dimensional (1-D) relative histogram is generated and applied to compare occurrences in event channels for a multi-channel signal data set. Practically, a multi-channel processor for processing the signal data and related calculations includes signal memory for storing the signal data and each channel of that signal data is stored in arrays indexed to a common domain such as population, x,y coordinates or time.

Generally, for particular a data set, three or more event channels are provided and data in each event channel is typically related or corresponds in some manner with data in each other channel. In a color photographic image, the data set comprises at least three channels of the primary colors R, G and B, the occurrences in the event channels being represented and related by a plurality (in a population of i=1 to n in the image) of color dots (Ri=1, Gi=1, Bi=1), (R2,G2, B2), . . . (Rn,Gn,Bn). For color channels it is typical to have intensities of between (0,0,0) or black (dark or weak grey) and (255,255,255) or white (bright or strong grey). The red channel has data Ri to Rn. Each other channel, in this case G and B have corresponding data Gi to Gn and Bi to Bn. Conventional histograms solely compare occurrences of relative strengths or intensities in one of the event channels such as Ri to Rn. What the relationship of Ri to Gi to Bi may be is not contemplated in such conventional histograms.

In this embodiment, a channel comparator comprises comparing histograms for event channels to one another. Rather than summarizing occurrences of events, an approach for relative histograms is to summarize the occurrences (in the data set) of one event channel in relation to another event channel.

Figure 13:
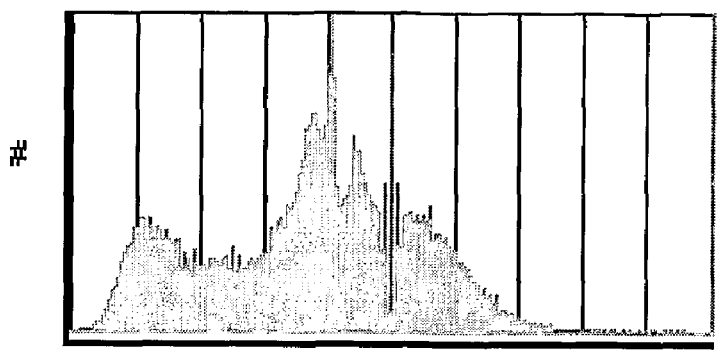
FIG. 13 is a relative histogram of green/red components of FIG. 1.
Figure 14:
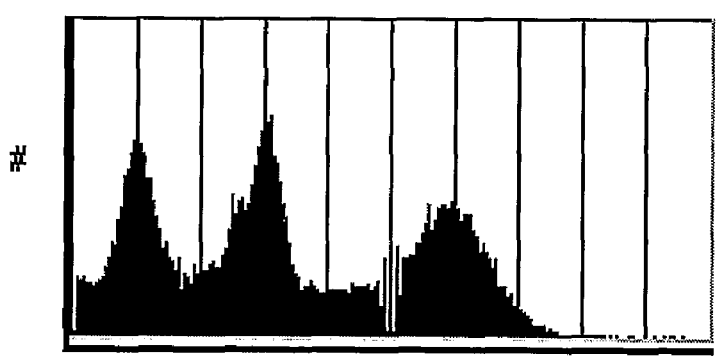
FIG. 14 is a relative histogram of blue/red components of FIG. 1.

Again, in the case of data for images such as color photographs, this would naturally take the form of a histogram including, for example, the quotient or ratio between primary colors R, G and B, as representing the red, green and blue channels. Without intending to be limiting, one might choose the red channel as a "reference" channel and create histograms using at least two relating functions such as a first relating function including green/red and at least a second relating function including blue/red. FIGS. 13 and 14 are examples of such relative histograms which result for FIG. 1. In this one-dimensional embodiment, each histogram presents the distribution of the number of occurrences in the data set of each of the calculated values representing the relationship between two data channels.

Techniques for Calculating Relative Histograms

In establishing such a technique, there are a number of difficulties which arise in formulating relative histograms. First, without meaning to be limiting, if the possible intensities or data range of a given primary color/channel considered is between 0 and 255 then the quotient or ratio will vary from 0 to infinity, specifically 0/255=0 or 255/0=∞. If one were to constrain the intensity or data to only those values between 1 and 255, then that removes the infinity issue but still gives a range of about 0 to 255. This is a problem where the two channels are equal and which would be natural to be considered the central point—and yet this is calculated to be 1.0. Also, as the numbers are naturally decimal numbers instead of integers, then one must then adjust the computed data to count occurrences.

When considering the relationship between two channels, it is convenient to consider whether the ratio between a first value (from the second channel) and second value (reference channel) is below of above a set point. For example, it is preferably the relating functions generate values where a ratio and its reciprocal are symmetrical about an identity value. For example, when comparing two numbers, a convenient set point is when they are identical say using a first relating function 50/50=1. When the values vary up and down from that set point, it is also convenient if the differential results in a like change in the quotient therebetween. In this example, using the first relating function, if the denominator increases to 100, then the ratio changes from 1 to 0.5. In order to obtain a like change in the ratio where in contrast the numerator increases to 100, then several techniques can be employed in a second relating function including taking the reciprocal of (100/50) which equals 1/(100/50)=0.5 again and then one adds 1 to obtain the result of 1.5 which is symmetrical about the identity value of 1 from the 0.5 result for 50/100. Similarly, the symmetrical results can be obtained by 2−(50/100)=1.5.

FIG. 15 is code, written in Microsoft™ Visual Basic, which provides one embodiment of a solution for overcoming these initial problems. As shown, it converts two numbers, a first value (in our example, an intensity or number from the green or blue channel data) and a second value or base number (the corresponding number from the reference (red channel), into a number first between 0 and 2 and scaled to a number between 0 and 200.

To constrain the relationship between two channels to real values, first, if the first value of the second channel is less than or equal to the second base value of the reference channel, a first related value is calculated using a ratio as we would conventionally expect a ratio to be calculated: If the first value (valu)<=base value (base), such as 50<=100 then a first related value (hist_valu)=(valu)/(base).

However, if this is not the case, such as 100>50 then the first related value can be calculated using the reciprocal ratio which is then subtracted from 2.0. The first related value (hist_valu)=2.0−(base)/(valu) which gives the pleasing result that all calculated values have these rather functional characteristics. All calculated related values lie between 0.0 and 2.0 (as opposed to 0 and infinity) with a symmetry abut a point (such as 1.0) representing the case where the value is equal to the base reference, for example reciprocal simple ratios 100/150 and 150/100 are calculated to lie equal distant from 1.0. Where green=100 and red=150, the value calculated is directly 0.66667. In the case of green=150 and red=100, the value calculated is 2−0.66667=1.33333. Both have a distance of 0.33333 from the center value of 1.0. Large distances from the center (1.0) is demonstrative of very different numbers of value and base and small distances from the center means the numbers are similar. Similarity suggests that the related channels are not very different.

And finally there is the matter of binning. The calculated real values are effectively rounded off allowing one to count in "bins" so to speak. This is done by multiplying the calculated relative value (hist_valu) by a constant, such as 100, and then converting to integers (f_hist_valu), yielding 201 bins (0 to 200) as follows: f_hist_valu=Int(100.0*hist_valu) and this is the value that the function of FIG. 15 returns to the histogram step which counts the function value occurrences.

For a color image, the above is performed for three channels as the relationship between a reference channel and each of a second channel and at least a third channel.

Turning to FIG. 16, a listing of Visual Basic Code illustrates the counting of the relative function value occurrences for a second channel/reference channel (green/red) relative histogram and a third channel/reference (blue/red) relative histograms. By avoiding the 0 values, the ratio function is saved from any possible "zero divide" (or "variable overflow") aborts.

Application of 1-D Relative Histograms

Figure 6:
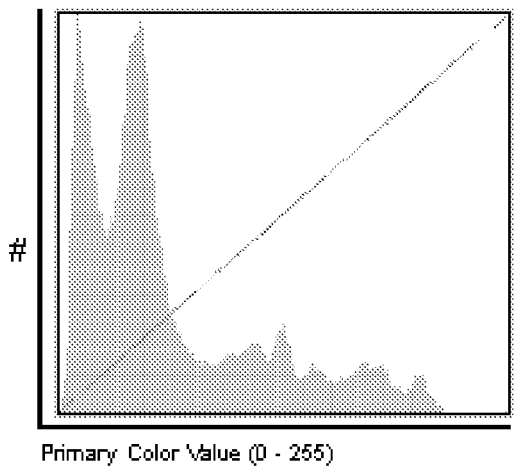
Figure 7:
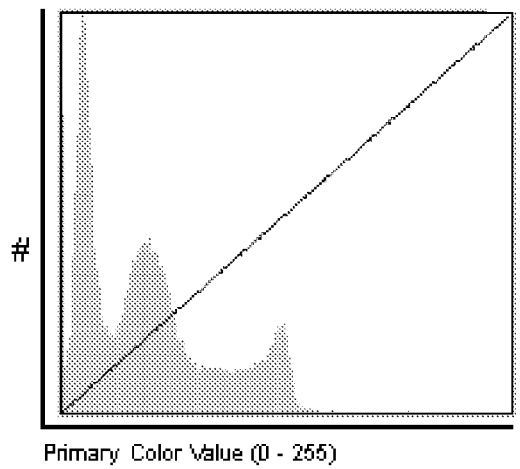
Figure 8:
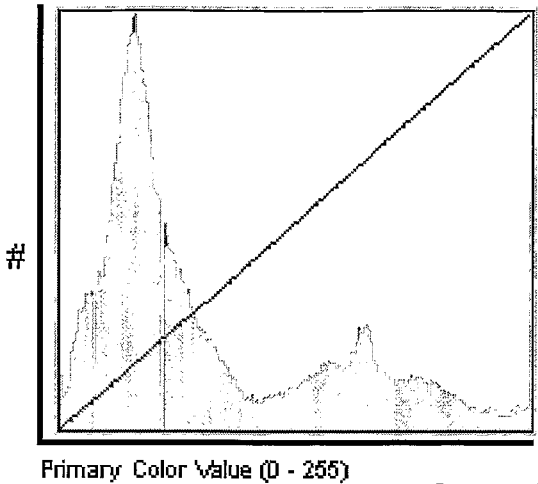
FIGS. 8, 9 and 10 are conventional stretched histograms of the red, green and blue channels of the original image of FIG. 1 respectively.
Figure 9:
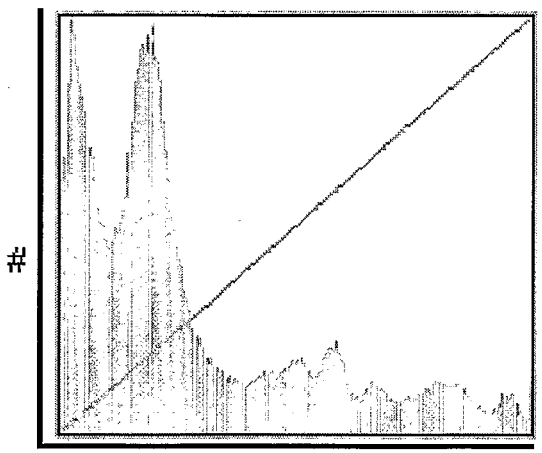
Figure 10:
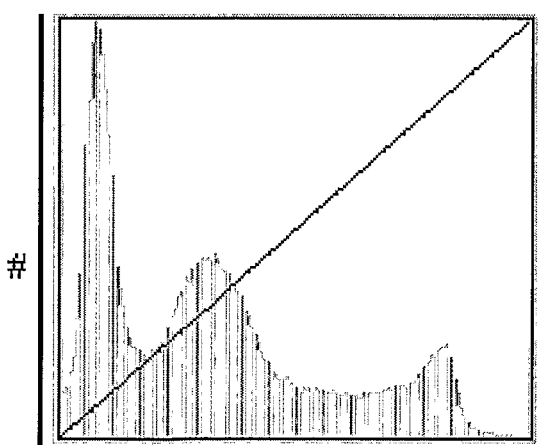
Figure 11:
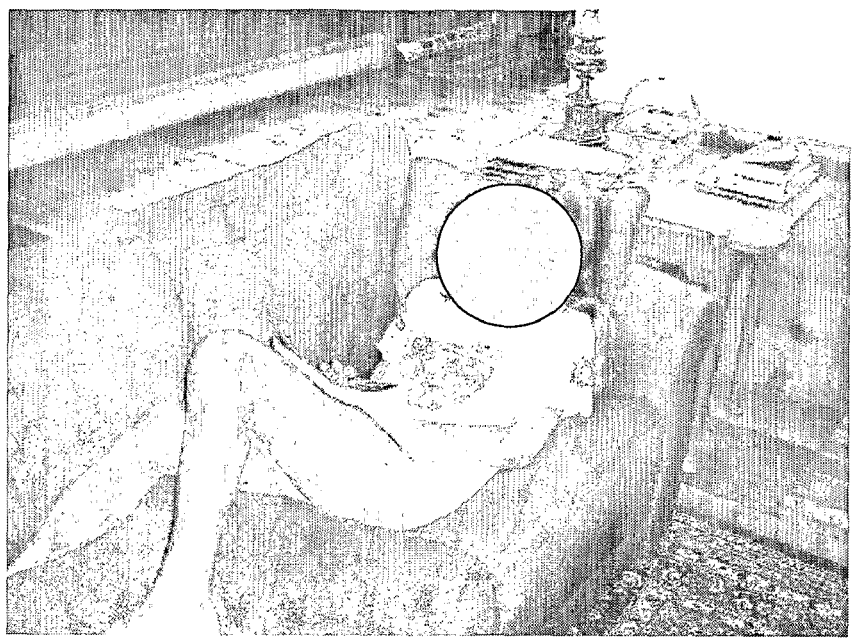
FIG. 11 is the photograph of FIG. 1 after correction using the stretched histogram modification of FIGS. 8-10.
Figure 12:
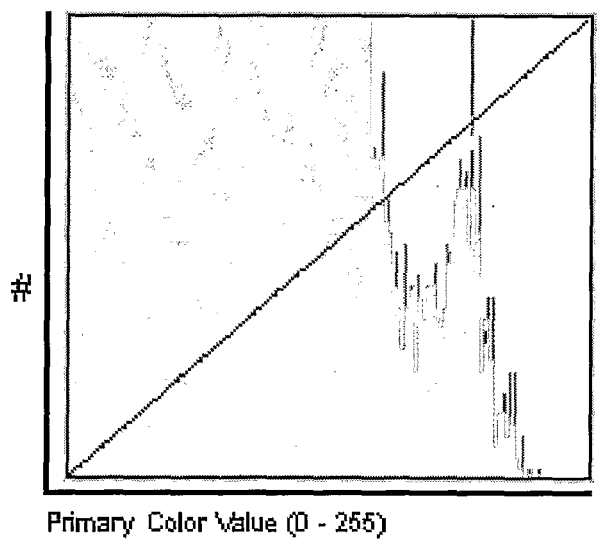
FIG. 12 is an amplified histogram of blue component of FIG. 1.

With reference to FIGS. 13 and 14, and when thinking in terms of relative histograms, it is apparent that the conventional or normal histogram stretching approach used in prior art leads to a quite different conclusion and corrective response that that suggested by the present invention. As shown in FIGS. 6 and 7 for the prior art, it is suggested that the green and blue could be increased in strength; the blue more so that the green. In the present invention, as shown in FIGS. 13 and 14, again both the green and blue channels suggest a need to be increased in strength (as in prior art), but this time only by an amount close to the same amount because the extent of the two relative strength histograms is nearly the same.

Whereas prior art FIGS. 6 and 7 led to the conclusion that the blue channel is need of serious correction, and green only needs a little correction; as shown by the degree of histogram stretching from FIGS. 7 to 10 compared to FIGS. 6 to 9. We recall from FIG. 11 that this led to the young woman's face turning blue.

In the embodiment for applying relative histograms for correction of tint, additional aspects are discussed below. In applying the relative histograms, there are additional characteristics and specifications which preferred are which are not limiting. The calculated relative value hist_valu falls between two real values such as 0 and 2 (as calculated above) or −1 to +1 (where the negative of the reciprocal is used rather than the difference from 2.0). The calculated function has symmetry about the center point with respect to reciprocal ratios. This is useful but not necessary. What is necessary is that the two bounding values or sides are close enough that useful plots can be made and that the inverse function can be written. The relative function returns with any fixed number of bin values (in our arbitrary specification here, 201 bins). The red channel can be used as the reference (in the example of FIG. 1, red being the strongest channel) although any one of the three would do.

The above case dealt effectively with a one-dimensional, relative histogram.

Two-Dimensional Relative Histogram

While a histogram generator can form one or more 1-D histograms, some of the comparative subjectivity can be reduced by generating a two-dimensional (2-D) relative histogram. In such an additional embodiment, the essential idea behind having a single 2-D relative histogram instead of two 1-D relative histograms is that it be a less destructive representation, and thus a more detailed visualization, of the same signal data. A two dimensional histogram is a plot of two variables, where each axis is divided into a number of bins and has its own range and can have its own bin size. A set of bins count the number of events falling in a given area of the (x,y) plane. Preferably, the data set of the multi-channel signal data is presented in this two-dimensional histogram for establishing a deviation of significant counts from an adjustment point which is preferably at the identity value.

Figure 17:
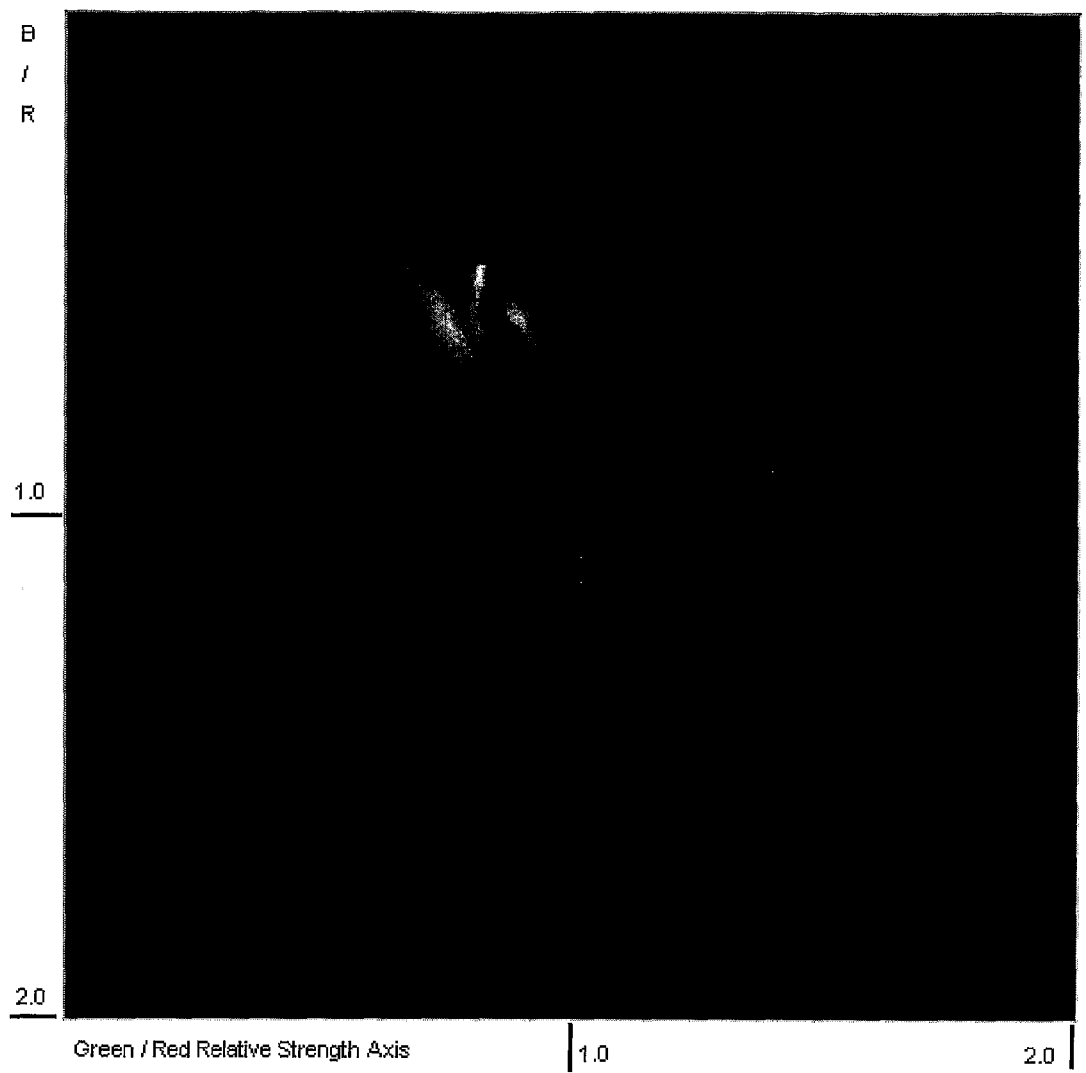
FIG. 17 is a resulting 2-D relative histogram of the photograph of FIG. 1.

In this two-dimensional embodiment as shown in FIG. 17, the histogram presents the range for each of X and Y as a matter of a change in displayed intensity. The distribution is indexed for both X and Y. The distribution represents the calculated relationship between a first pair of channels further indexed to the calculated relationship between a second pair of channels. FIG. 17 is the single 2-D relative histogram data derived from FIG. 1. FIG. 18 is the visual basic code used to create the data for FIG. 17 through a counting of relative value occurrences. It also uses the function listed as the 201 bin example of FIG. 15 with the only modification that 501 bins are used to give the resulting image increased resolution for the plot. Since we are in 2-dimensions, this means that there are 501*501 bins. For example for channels R, G and B a count on the 2-D histogram is incremented when each time there is an occurrence of $X_1Y$ at (0.8, 1.4) including where the $213^{th}$ data point $G_{213}/R_{213}=0.8$ and $B_{213}/R_{213}=1.4$ and also when $G^{499}/R_{499}=0.8$ and $B_{499}/R_{499}=1.4$.

The following points define how the relative strength 2-D histogram is displayed. The first relative function for green/red values returned from the function (f_hist_valu) lie along the horizontal axis. The value calculated is displayed at the 1.0 and 2.0 values. The second relative function for blue/red values returned from the function (f_hist_valu) lies on the vertical axis. The decimal value calculated corresponding to this value is displayed at the 1.0 and 2.0 values. So as to represent multiple occurrences in the 2-D histogram (x,y), the "whiteness" or intensity of the coordinates in the image is the scaled histogram count, no counts being black and many counts being white.

Application of 2-D Relative Histograms

What is surprising, comparing the 2-D histogram embodiment of FIG. 17 to the 1-D embodiment of FIGS. 13 and 14, is that the image is nearly black (few occurrences) and that the main concentration of occurrences is extremely localized and detailed in locality. FIGS. 13 and 14 do not overtly suggest this, and in fact, appear to suggest the very opposite as the count distribution is rather broad.

Figure 19:
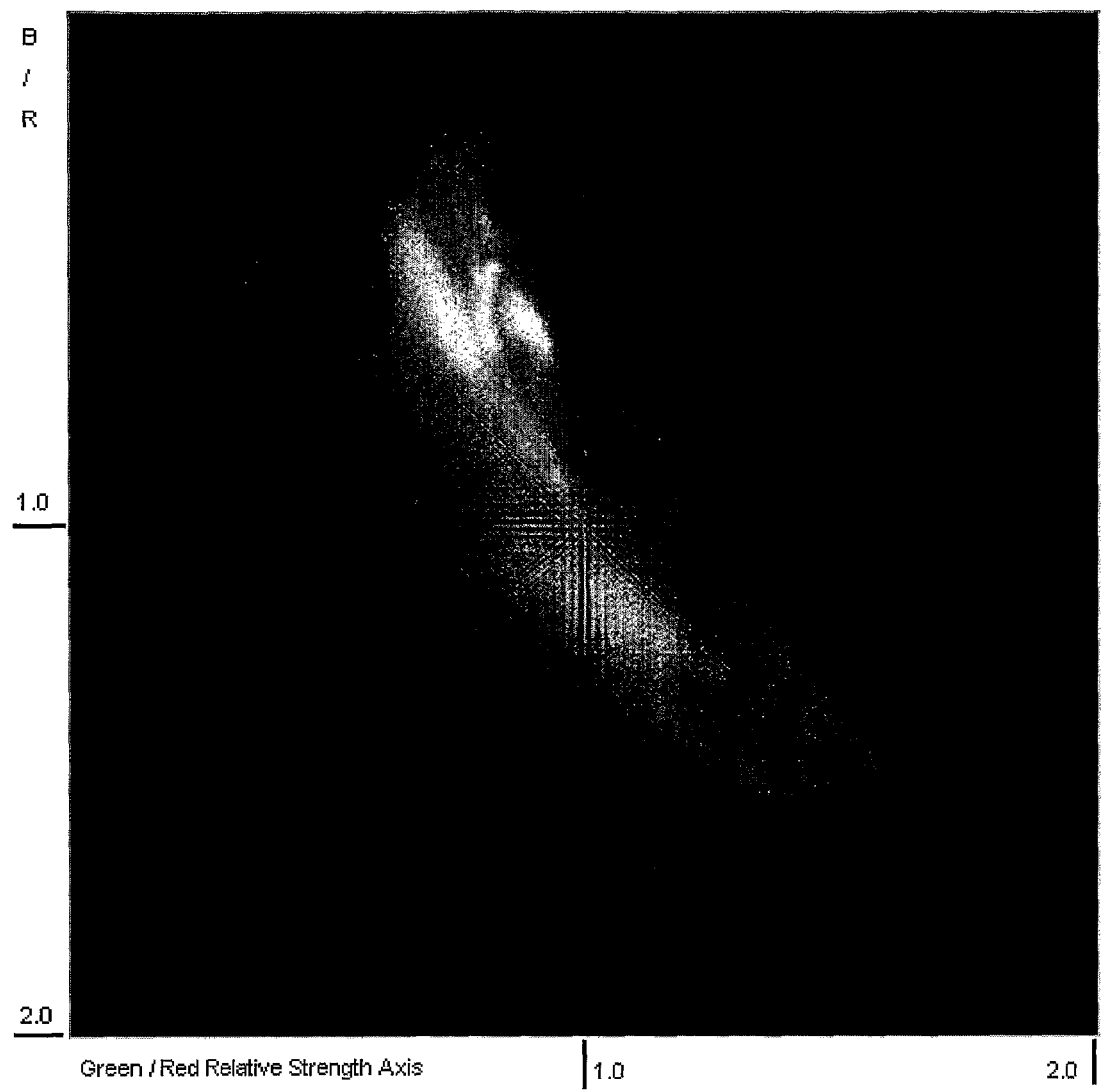
FIG. 19 is a logarithmic enhancement 2-D relative histogram of FIG. 1.

With reference to FIG. 19, the 2-D relationship is accentuated with a plot of the logarithm of the count of the 2-D relative histogram. A logarithmic representation of the number of counts aids in the illustration as the eye is rather insensitive to intensities compared to the vertical displacements of 1-D histograms. Logarithms show weaker values better in an intensity display. We see that there are a lot of weak counts distributed across a significant band of the image and this explains the broadness of the counts in FIGS. 13 and 14. In other words, a careful examination of the 2-D relative strength histogram can explain the 1-D relative strength histograms but not the other way around. There is nothing in FIGS. 13 and 14 to suggest the highly localized nature of the stronger counts in FIG. 17. This is, of course, an entirely reasonable situation due to the extra resolving power of the 2-D relative strength histogram, tens or even hundreds of thousands of bins ($501^2=251,001$) as opposed to a few hundred (501).

It is unexpected to find this tightness in the stronger count distribution, similar a kind of mathematical transform which may permit an after-the-fact signal gathering sensor calibration without specific knowledge of the sensors.

In another embodiment of the present invention, the 2-dimensional relative histogram is applied for tint correction. As an introduction, one might review how true whites and true grays are expressed in the 2-D relative histogram. In terms of the $(R_1G_1B)$ triplet, any triplet that holds the same value three times (e.g. (50, 50, 50), (100, 100, 100), (200, 200, 200)) represents a gray value. The difference between white and gray is simply that white is a strong gray (e.g. (255, 255, 255). All gray values show up in the 2-D relative histogram as green/red=1.0 and blue/red=1.0 (i.e. (x,y)=1.0, 1.0).

One reason that a conventional prior art histogram approach to tint correction works as well as it does is that the approach is equivalent to making a reasonable assumption about the data. It is assumed that the corrected photograph will have similar range of significant values in each of the three normal histograms for R, G and B. This is not unreasonable but it is not necessarily true either.

A different assumption is made when using the 2-D relative histogram embodiment for tint correction. The set of "reasonable assumptions" that can be made to utilize a given technology is constrained by what that technology can recognize. In the case of 2-D relative histograms, the reasonable assumption applied herein is about the distribution of colors as they appear in the 2-D relative histogram. An assumption is that there should exist in the corrected image either a significant amount of gray/white values (1.0, 1.0) or a distribution of significant values which occupy or span the (1.0, 1.0) value. In other words, without needing to consider the intensity of any of the measured colors, there should be some distribution of colors which either includes white (gray) or encompasses white (gray).

This is again, of course, not necessarily true. One can imagine an accurate photo that includes only subtle shades of orange, for example. However, the assumption is far less limiting than that made by the normal histogram correction. The idea that most photographic scenes will either include a bit of gray somewhere or have a bit of a range of colors will be true for the great majority of photos.

Figure 20:
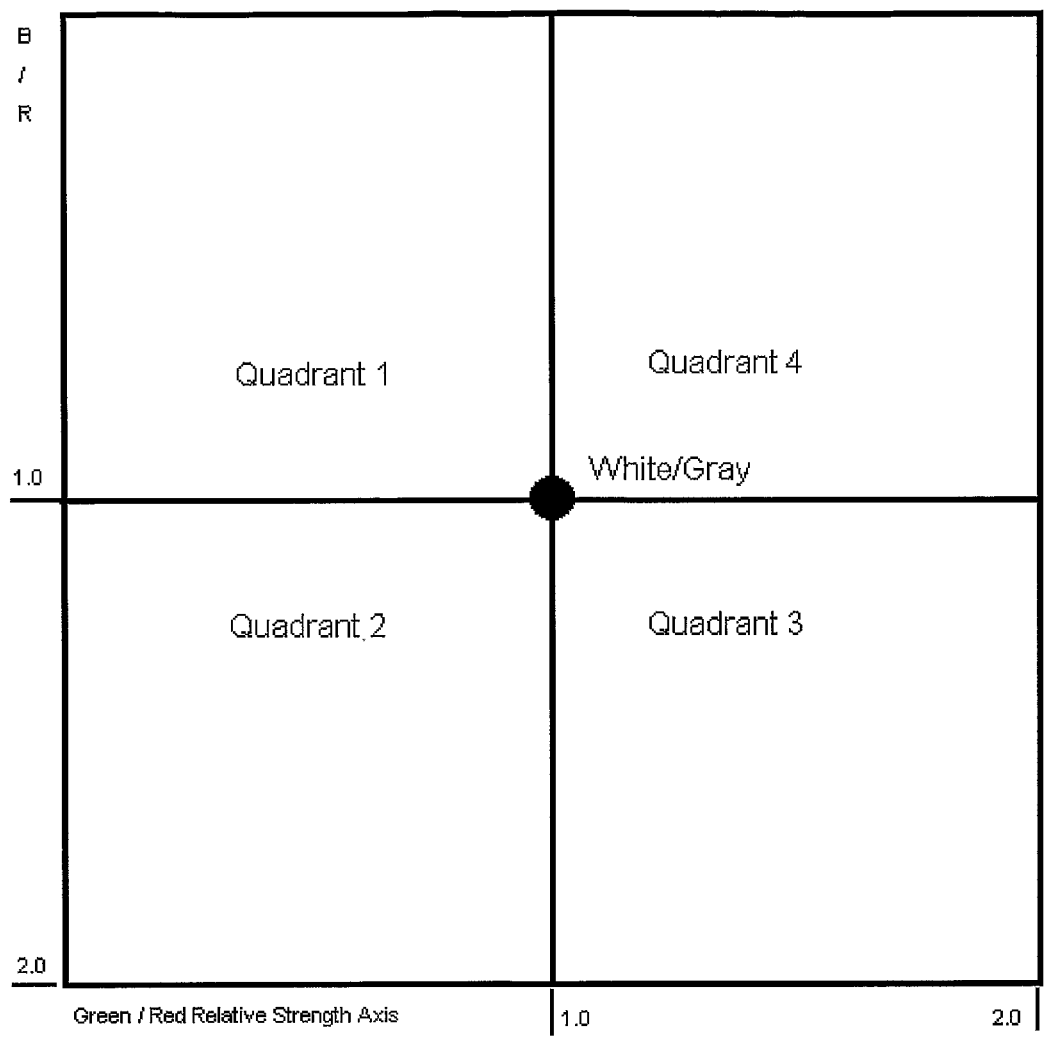
FIG. 20 illustrates the quadrants of a 2-D relative histogram.

FIG. 20 shows the domain of the 2-D relative histogram being broken into four quadrants. The central dot (1.0, 1.0) shows the position of the occurrence of gray values. Whether the image would benefit from correction can be suggested by the distribution in a 2-D relative histogram image and deviation from the identity value at the intersection of the quadrants.

If a photograph has significant 2-D relative histogram counts in any 3 of the quadrants, this is taken to mean that it has colors that encompass white/gray and therefore does not need correction. It is important to point out that the distribution of colors can come from any recorded intensity. For example, all the histogram counts in one quadrant may come from a dark area of the photo and all the counts in another quadrant may come from a brighter area of the photo. Thus the identification of the range of colors is not influenced by the intensity of the colors. This is a major problem in the traditional histogram approach as the prior art "reasonable" statistical assumption must apply over all the bright areas as well as all the dark areas. Here, dark and bright areas are given consideration at the same time without any preference to the strength or weakness of the (R,G,B) values.

Symbolically the logical decision making of the invention is: Find 2-D relative histogram of photograph: If significant counts span less than 3 quadrants then correct (scale) the channels so there will be some gray in the photograph; else do not correct.

In the case of the photograph of FIG. 1 and the relative histogram of FIG. 19 (the Logarithm) one can see that there is significant total count in all four quadrants. Therefore, no correction would need to be performed as the distribution of colors in FIG. 1 encompasses white/gray.

In contradistinction, if the significant number of occurrences or energy spans only 1 or 2 quadrants, the photograph is deemed to be in need of correction. The correction is found by locating the position of significant count that is nearest the white/gray point (1.0, 1.0) and then applying a linear map to move this point to (1.0, 1.0). This is the mathematical representation of the idea that there should exist some white in the corrected photograph.

FIG. 21 is a list of visual basic code that is currently used to determine which 2-D relative histogram counts (bins) are significant. First, as a skilled in the art would understand, one creates a set of one dimensional (1-D) arrays to hold all of the 2-D relative histogram counts and the x and y indexes (not shown). A subroutine is called to copy the 2-D relative histogram counts and index values over to the 1-D arrays and then sort the 1-D version into descending order while keeping track of indexes. The entire 1-D array is summed to determine the total count or total number of occurrences (fTotal). The upper 1% of the array is summed to determine the 1% most significant counts (fSum). One determines what fraction of the entire count is found in the upper 1% (fRatio) By the use of a linear map, this value is converted to indicate the percentage of the sorted array that is significant. This value is called corr_pcnt in the code. The linear map was found by empirical means (by examining many photos) and is not meant to be limiting.

Figure 22A:
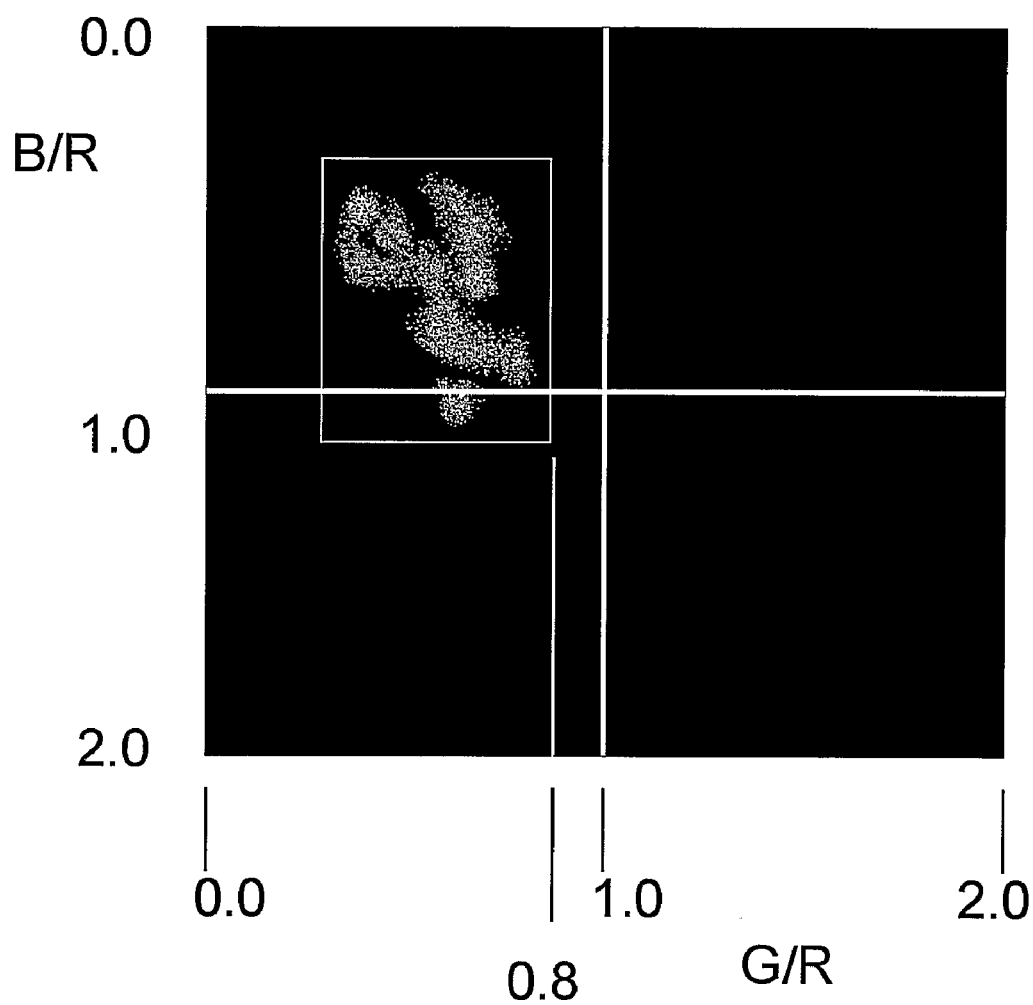
FIG. 22*a* is a 2-D relative histogram illustrative of a fanciful image deficient in green and being a candidate for correction.

As a result, and having reference to FIG. 22a, a bounding box is represented and in a fanciful example, the most significant counts are in Quadrants 1 and 2 but none are at or in Quadrants 3 and 4. We now have an estimate of which counts are significant and know their location. The size of the 2-D relative histogram, in this example of FIGS. 22a and 22b, is 101 by 101 and the 1-D sorted version is then 10201 (=$101^2$). This specification is not meant to be limiting. It is arbitrary. An adjustment of the data, in this embodiment of the image, is related to determining the number of quadrants used and, if needed, the index position of the nearest significant count.

This is considered to be achievable by anyone skilled in the art without example. What needs to be done is simply to find the number of quadrants with significant counts and if there is only a single quadrant or two adjacent quadrants then a correction is needed. The correction is based on the x and y (horizontal and vertical) position of the nearest significant count to the (1.0, 1.0) white/gray point. Once it is determined that a correction is needed and the position of the nearest significant count (to (1.0, 1.0)) is located, then the correction is taken to be a simple common multiplication of all values in the green and blue channels. FIG. 22b is Visual Basic Code to arrive at those multiplier values.

First, "correction" values are identified by simply dividing the values of both the x and y indexes by the x and y indexes, respectively, of white/gray, such as (50,50) without meaning to be limiting. These "correction values" are really just the histogram x and y coordinates in terms of the 0.0 to 2.0 range. As shown in FIG. 22a, while the relative B/R includes some grey, the significant counts in the G/R appear deficient ending at 0.8. The G data is weak relative to the R data. To correct the related values to the (1.0, 1.0) white/gray point, the values are shifted or scaled from 0.8 to 1.0. The data on the G/R axis is scaled. If the B/R were similar deficient then both axes could be scaled. As the correction is less than 1 then a correction multiplier for the data in the green channel would be 1/0.8 of 1.25. The correction values are turned into "correction multipliers" by using adapting the function used in the creation of relative strength histograms in the first place from FIG. 15. The correction is then applied by looping through the entire image to apply the corresponding correction multipliers to each dot and every dot and then to reconstruct the image. This is thought to be achievable by someone skilled in the art.

Some Further Examples

Figure 23:
FIG. 23 is another example of a color photograph having a red tint and a subsequent red tint removal correction using one embodiment of the invention.
Figure 24:
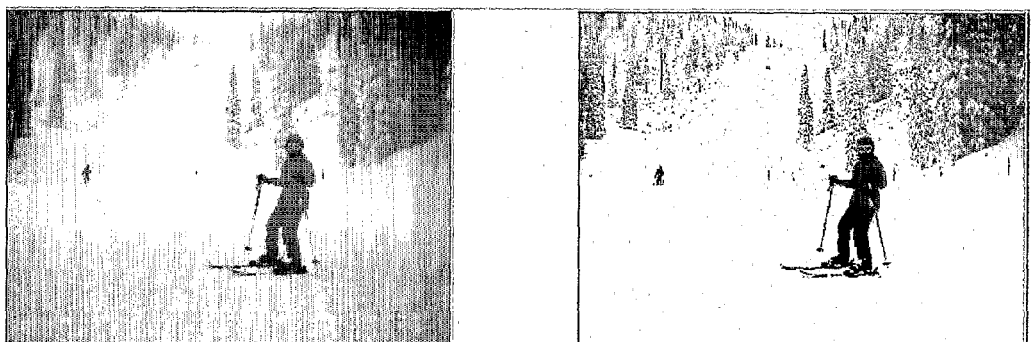
FIG. 24 is another example of a color photograph having a blue tint and a subsequent blue tint removal correction using one embodiment of the invention.

FIGS. 23 and 24 are examples where the current invention provides a rather nice tint correction to remove red tint and blue tint respectively.

Figure 25:
FIG. 25 is another example of the color photograph of FIG. 1 in which is demonstrated that the color balance is within tolerances and no correction is ultimately applied.
Figure 26:
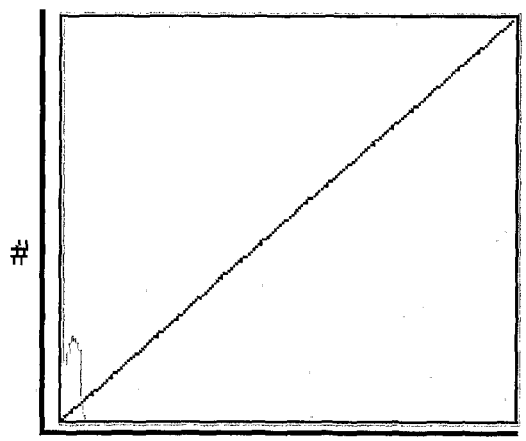
FIG. 26 is a conventional histogram showing channel which has only counts at very weak strengths.

FIG. 25 shows that the current invention has determined that FIG. 1 should not be corrected.

In some cases, correction is discouraged. For example, as set forth in FIG. 26, a normal histogram shows one channel that only has counts at very weak strengths. If the other channel histograms show a more broad distribution, then such photos should not be corrected as there is inadequate information contained in the extremely weak channel. (In this case—the blue component).

The embodiments of the invention for which an exclusive property or privilege is claimed are defined as follows:

1. A multi-channel signal processor comprising:
    a signal memory for receiving and storing a plurality of data for a reference channel and each of two or more additional channels for a data set;
    a first relative array for storing a plurality of first related values, the plurality of first related values being established by obtaining a first relative function relating a second channel of the at least two or more additional channels to the first reference channel and being distributed symmetrically about an identity value from reciprocal values of the plurality of first related values;
    a second relative array for storing a plurality of second related values, the plurality of second related values being established by obtaining a second relative function by relating a third channel of the at least two or more additional channels to the first reference channel and being distributed symmetrically about an identity value from reciprocal values of the plurality of second related values; and
    a channel comparator for forming one or more histograms for determining the distribution of the first and second related values.

2. The multi-channel processor of claim 1 wherein the channel comparator comprises:
    a first one-dimensional histogram for determining the distribution of the first related values; and
    a second one-dimensional histogram for determining the distribution of the second related values.

3. The multi-channel processor of claim 1 wherein the channel comparator comprises a two-dimensional relative histogram for determining the distribution of the first related values indexed to the second related values.

4. The multi-channel processor of claim 3 further comprising a correction function for determining the most significant histogram value of the two-dimensional relative histogram and determining if the most significant histogram value spans or is spaced from the identity value.

5. The multi-channel processor of claim 4 wherein if the most significant histogram value closest to the identity value, is spaced therefrom, then the channel data is shifted so as to shift the most significant histogram value to the identity value.

6. The multi-channel processor of claim 1 wherein:
    the plurality of first related values are binned prior to storing in the first relative array; and
    the plurality of second related values are binned prior to storing in the second relative array.

7. The multi-channel processor of claim 1 wherein the relative function is one of: the ratio of a channel of the at least two or more additional channels and the reference channel where the channel is less than or equal to the reference channel; and the negative reciprocal of the channel and the reference channel where the channel is greater than the reference channel.

8. The multi-channel processor of claim 1 wherein the relative function is one of: the ratio of a channel of the at least two or more additional channels and the reference channel where the channel is less than or equal to the reference channel; and the difference of the constant two and the reciprocal of the channel and the reference channel where the channel is greater than the reference channel.

9. The multi-channel processor of claim 1 wherein the data set corresponds to a photographic image and the plurality of first related values relate the data of one of R,G and B channels to the reference channel from another of R,G and B channels and the plurality of second related values relate the data of another of the R,G and B channels to the reference channel.

10. The multi-channel processor of claim 1 wherein the channel comparator further identifies deficiencies in the first reference channel, the second channel and the third channel when compared to the other, the multi-channel processor further comprising a correction function for adjusting one or both of the second and third channels.

11. A method for obtaining a distribution of the relationship between multiple channels of a signal data set comprising:
    selecting a first reference channel of the signal data set;
    obtaining a first relating function by relating a second channel of the signal data set to the first reference channel for establishing a plurality of first related values by a multi-channel signal processor;
    obtaining a second relating function by relating at least a third channel of the signal data set to the first reference channel for establishing at least a plurality of second related values indexed to the first related values;
    forming one or more relative histograms of the occurrences of the plurality of first related values and the plurality of second related values; and
    wherein the plurality of first related values from the first relating function are distributed symmetrically about an identity value from reciprocal values of the plurality of first related values and wherein the plurality of second related values from the second relating function are distributed symmetrically about an identity value from reciprocal values of the plurality of second related values.

12. The method of claim 11 wherein the one or more relative histograms are formed by a two-dimensional relative histogram of the occurrences indexed to both of the plurality of first related values further indexed to the plurality of second related values.

13. The method of claim 12 wherein the domain of the two-dimensional relative histogram is in quadrants, further comprising:
    determining which of the occurrences are significant; and
    where the significant occurrences lie in less than three quadrants, then adjusting the related channels to shift the significant occurrences to lie at or in all four quadrants.

14. The method of claim 13 wherein the adjustment comprises scaling the channel for the axis of the two-dimensional histogram which is being adjusted.

15. The method of claim 14 further comprising designating an adjustment reference point in the two-dimensional histogram.

16. The method of claim 15 wherein the adjustment reference point is about a point at which the quotient of the first reference channel and the second channel is one and at which the quotient of the first reference channel and the third channel is one.

17. The method of claim 11
wherein the first relating function includes a quotient between the first reference channel and the second channel; and
wherein the second relating function includes a quotient between the first reference channel and the third channel.

18. The method of claim 11 wherein the first relating function is a ratio of the second channel and the reference channel where the second channel is less than or equal to the reference channel; and a ratio of the negative reciprocal of the second channel and the reference channel where the channel is greater than the reference channel; and wherein the second relating function is a ratio of the third channel and the reference channel where the third channel is less than or equal to the reference channel; and a negative reciprocal of the third channel and the reference channel where the third channel is greater than the reference channel.

19. The method of claim 11 wherein the first relating function is a ratio of the second channel and the reference channel where the second channel is less than or equal to the reference channel; and the difference of the constant two and the ratio of the reciprocal of the second channel and the reference channel where the second channel is greater than the reference channel; and wherein the second relating function is a ratio of the third channel and the reference channel where the third channel is less than or equal to the reference channel; and the difference of the constant two and the reciprocal of the third channel and the reference channel where the third channel is greater than the reference channel.

20. The method of claim 11 wherein the signal data set corresponds to a photographic image and the plurality of first related values relate the data of one of R,G and B channels to the reference channel from another of R,G and B channels and the plurality of second related values relate the data of another of the R,G and B channels to the reference channel.

21. A method of relating data channels to one another comprising:
relating the data of a first reference channel to the data of a second channel of the data channels for establishing a first array of first related values by a multi-channel signal processor, where the first array of first related values are determined by a first relative function and a ratio of the second channel to the first reference channel and its reciprocal are distributed symmetrically about and identity value;
relating the data of the first reference channel to the data of at least a third channel of the data channels for establishing a second array of second related values, where the second array of second related values are determined by a second relative function and a ratio of the at least third channel to the first reference channel and its reciprocal are distributed symmetrically about and identity value; and
determining one or more histograms corresponding to a distribution of the first related values and the second related values.

22. The method of claim 21, wherein the one or more histograms comprises:
determining a first relative histogram corresponding to a distribution of the first related values; and
determining a second relative histogram corresponding to a distribution of the second related values.

23. The method of claim 21, wherein the one or more histograms comprises:
determining a two-dimensional relative histogram corresponding to a distribution of the first related values indexed to the second related values.

24. The method of claim 21 wherein the signal data corresponds to a photographic image and the first and second related values relate the data of one of R,G and B channels to another of R,G and B channels.

25. A computer program stored on a non-transitory computer-readable storage memory that is configured to effect the following operations when executed by a processing system:
selecting a first reference channel of a signal data set;
obtaining a first relative function by relating a second channel of the signal data set to the first reference channel for establishing a plurality of first related values, the first relative function is such that ratios between the second and first reference channels are distributed symmetrically about an identity value from reciprocal values of the second and first reference channels;
obtaining a second relative function by relating a third channel of the signal data set to the first reference channel for establishing a plurality of second related values indexed to the first relative value, the second relative function is such that ratios between the third and first reference channels are distributed symmetrically about an identity value from reciprocal values of the third and first reference channels;
forming two or more relative histograms for the plurality of first related values and the plurality of second related values, the one or more relative histograms are in the form of a two-dimensional relative histogram of the occurrences of the plurality of first related values indexed to the plurality of second related values; and
comparing the two or more relative histograms.

26. The computer program of claim 25 wherein the two or more histograms are the form of a two-dimensional relative histogram of the occurrences of the plurality of first related values indexed to the plurality of second related values.

27. The computer program of claim 25
wherein the first relative function is a ratio of the second channel and the first reference channel where the second channel is less than or equal to the first reference channel; and a ratio of the negative reciprocal of the second channel and the first reference channel where the second channel is greater than the first reference channel; and
wherein the second relative function is a ratio of the third channel and the first reference channel where the third channel is less than or equal to the first reference channel; and a ratio of the negative reciprocal of the third channel and the first reference channel where the third channel is greater than the first reference channel.

28. The computer program of claim 27 wherein the domain of the two-dimensional relative histogram is in quadrants, and wherein the comparing of the relative histograms comprises an array of significant occurrences of the plurality of first related values indexed to the plurality of second related values; and where the significant occurrences lie in less than three quadrants, then the related channels are adjusted to shift the significant occurrences to lie at or in all four quadrants.

29. The computer program of claim 28 wherein the adjustment comprises scaling the channel for the axis or axes of the two-dimensional histogram which is being adjusted.

* * * * *